Feb. 1, 1955  F. ABERLIN  2,700,821
APPARATUS FOR TRIMMING CHEESE
Filed Sept. 14, 1950  4 Sheets-Sheet 1
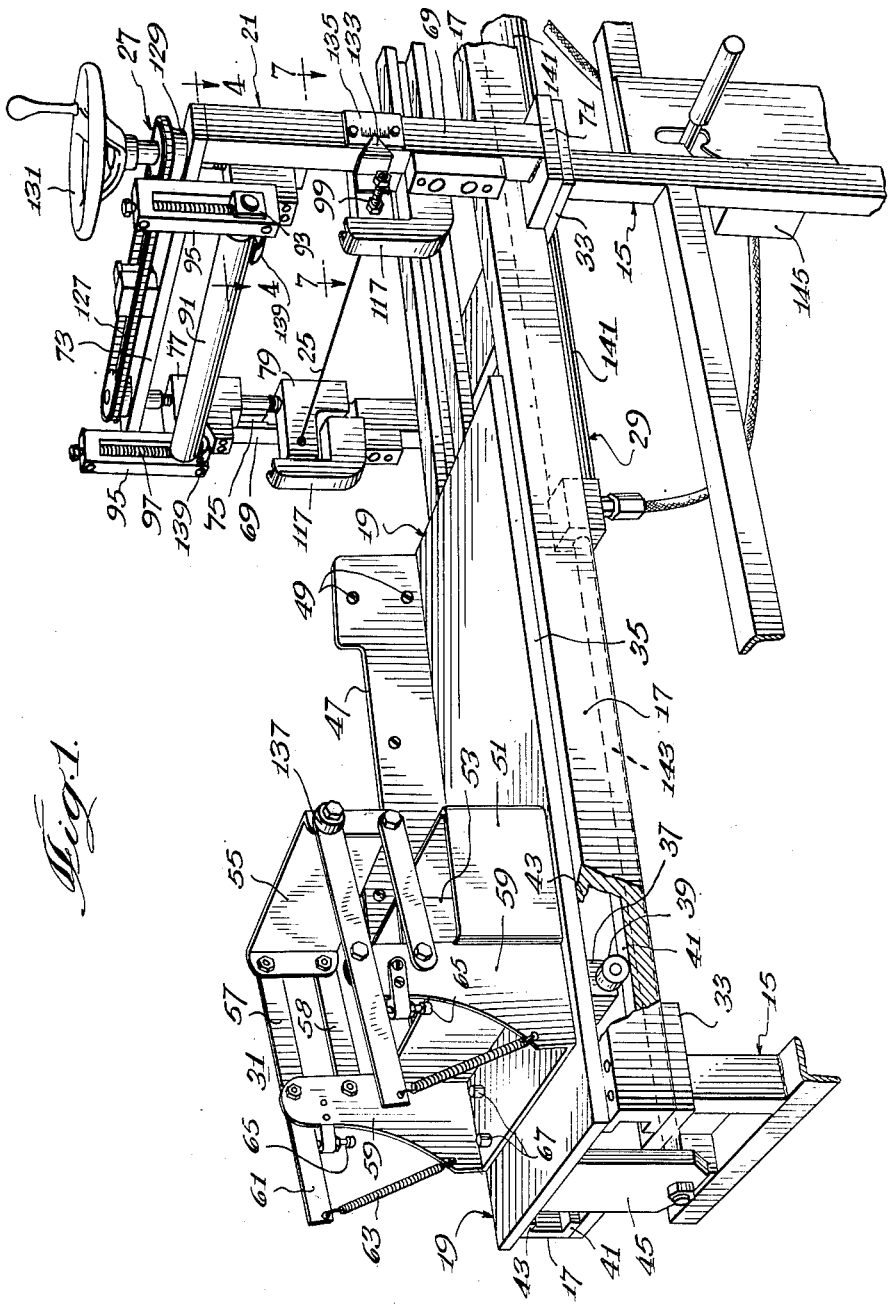

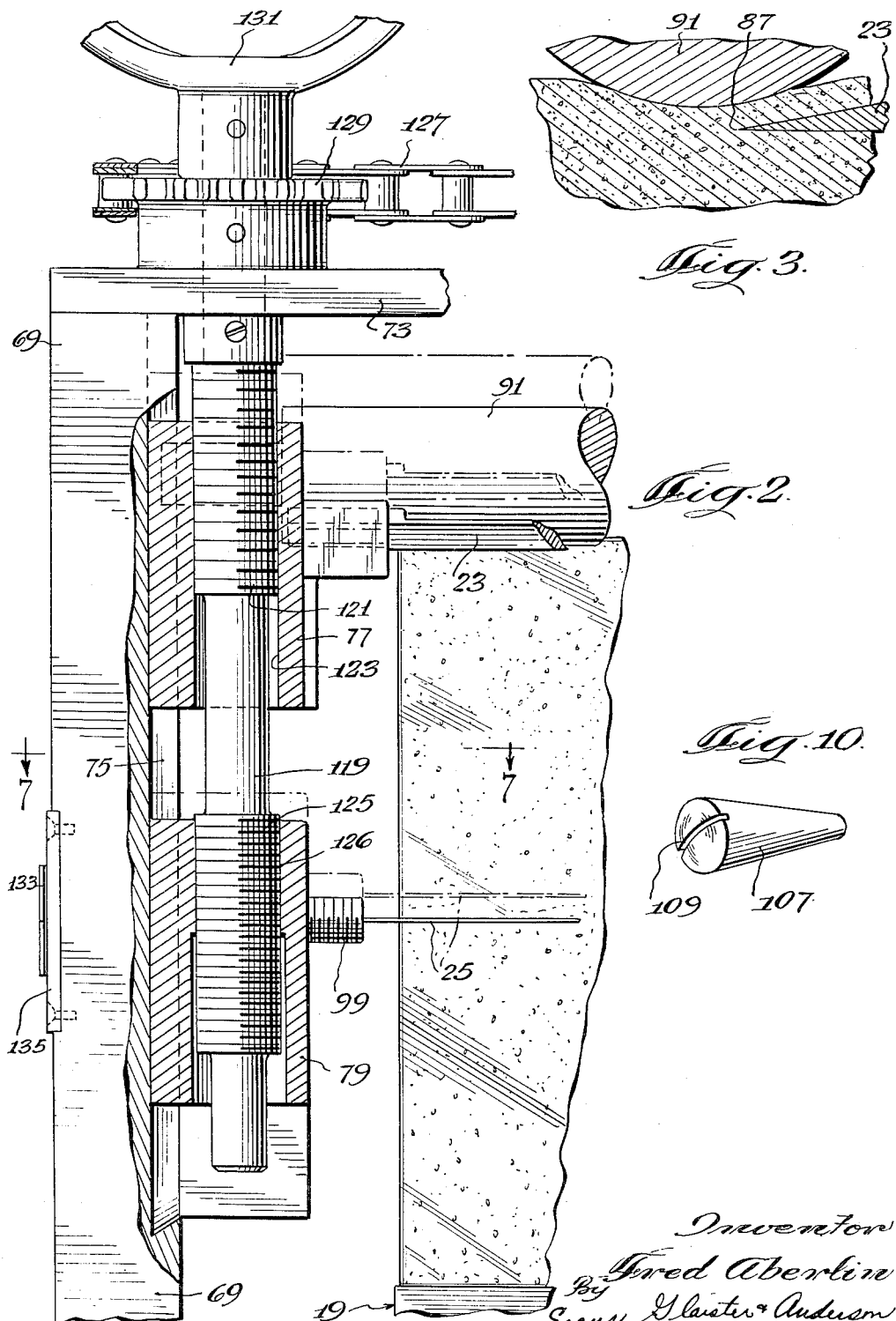

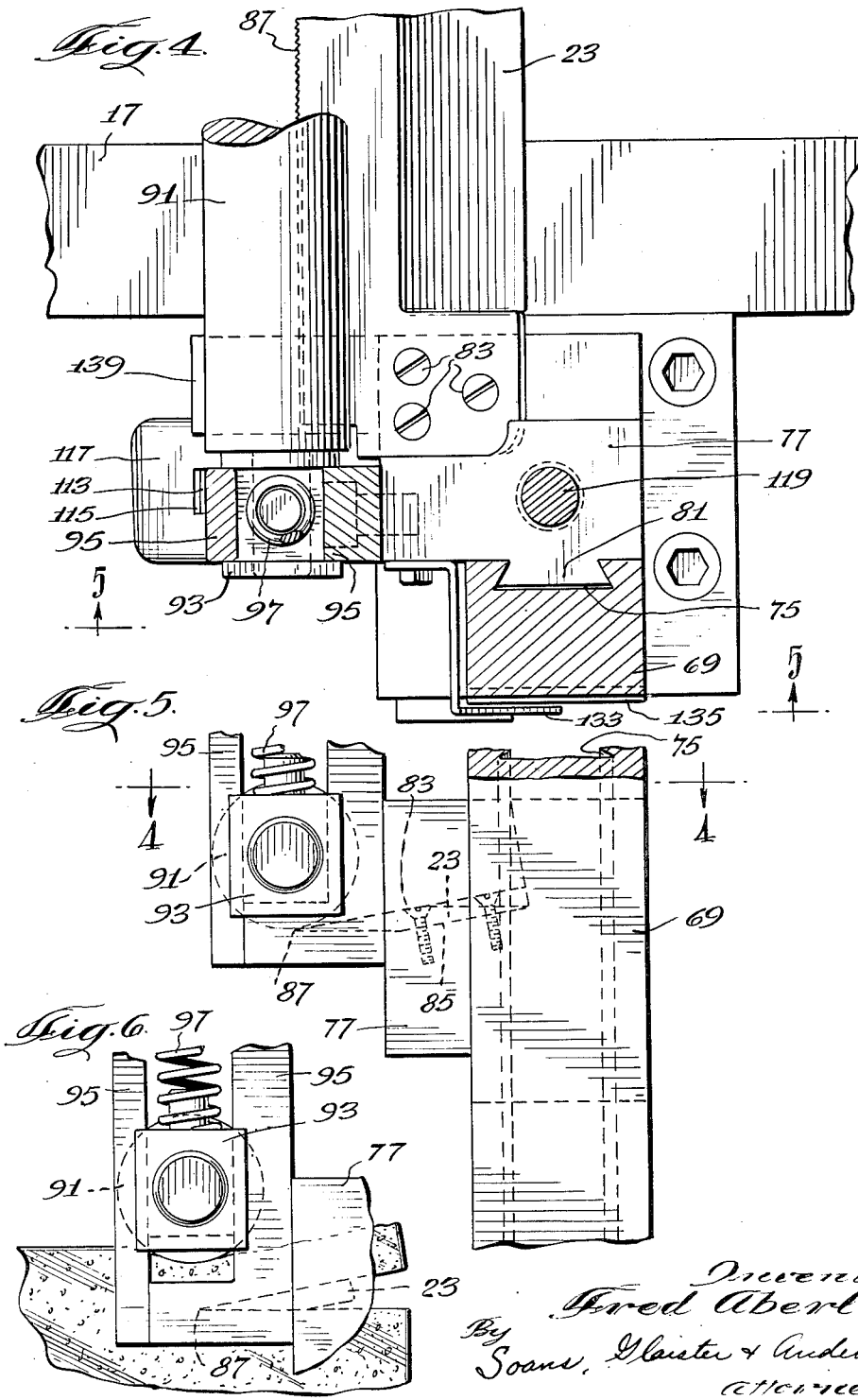

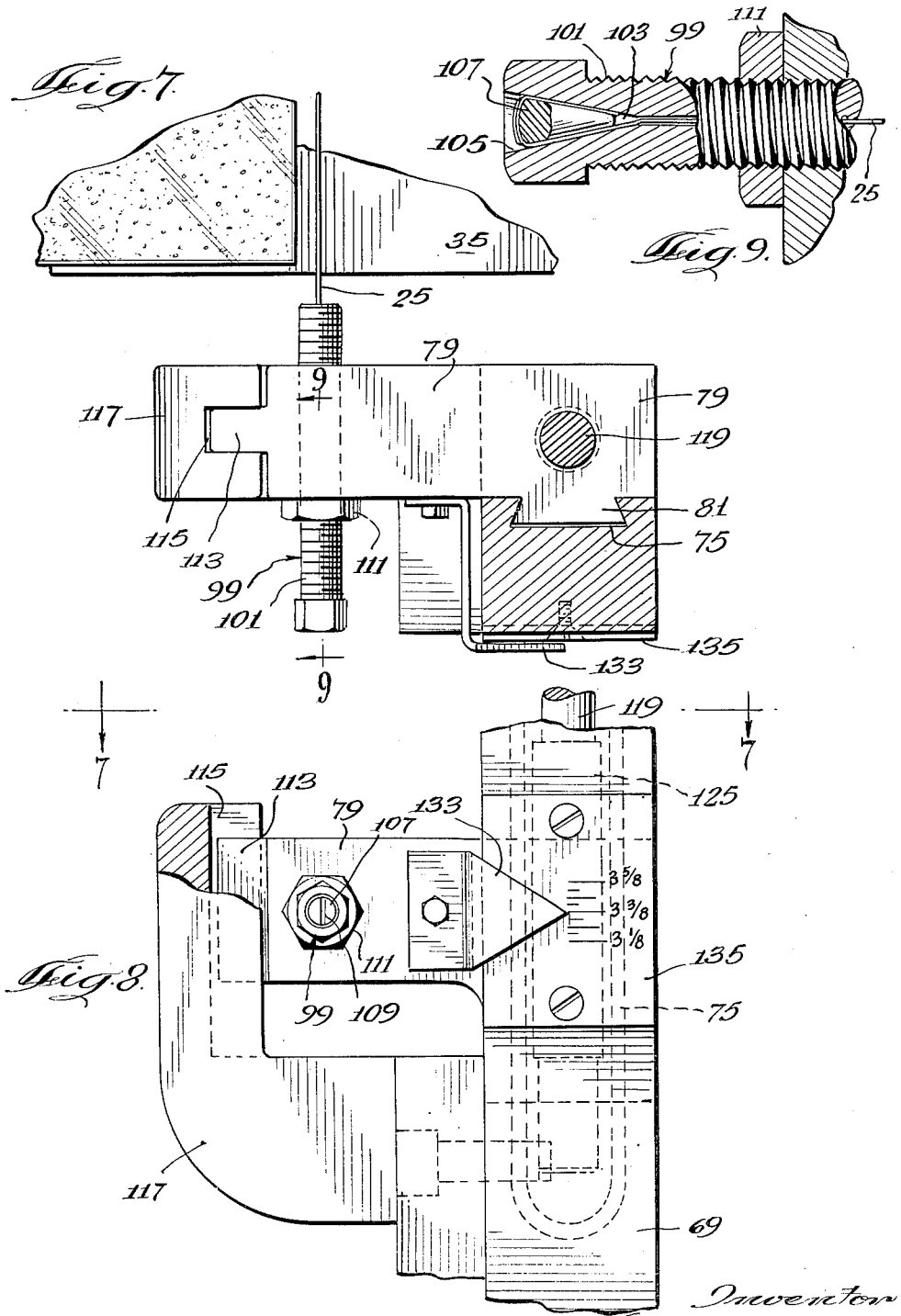

ary elevational view,
United States Patent Office 2,700,821
Patented Feb. 1, 1955

2,700,821

APPARATUS FOR TRIMMING CHEESE

Fred Aberlin, Chicago, Ill., assignor, by mesne assignments, to Kraft Foods Company, Chicago, Ill., a corporation of Delaware Application September 14, 1950, Serial No. 184,787

1 Claim. (Cl. 31—20)

The present invention relates to a method and apparatus for cutting cheese, and is directed particularly to the removal of a surface layer of varying thickness from an irregularly shaped block of cheese.

Natural cheese is manufactured in relatively large blocks which in many cases are subsequently divided into smaller blocks of uniform size for packaging. As a result of certain steps in the manufacture of the cheese, the blocks may be irregularly shaped, one or more surfaces being oblique relative to the other surfaces, or being non-planar, or having various types of minor surface irregularities such as isolated marks or depressions. Since the division of the large block of cheese into a multiplicity of smaller blocks is preferably performed in a single, mass cutting operation in which a plurality of cutting elements are located relative to the block by reference to one or more of its surfaces, it is desirable that the various surfaces of the block be properly related to one another so that the individual blocks produced will be of uniform size and weight. For the same reason, it is desirable that minor surface irregularities be removed before the block is cut.

Various methods have heretofore been employed and various types of cutting elements have been used for shaping and sizing these large blocks of cheese. None of these, however, has been wholly satisfactory because of the difficulties presented by the fact that the surface layer of cheese which must be removed in order to properly shape the block is not uniformly thick. The resulting variation in cutting pressures and in the resistance to the passage of the cutting elements through the cheese causes non-uniform deflection of these cutting elements with the result that a plane surface or approximately plane surface of the type essential to the mass cutting operation previously described cannot be obtained.

It has been observed, for example, that the cutting element may be deflected unevenly along its length as a result of variations in the depth of cut along the cutting element, and that the cutting element may tend to dip or dig as the thickness of the layer being removed increases in the direction of the cut. In either case, the new surface which is produced is irregular rather than plane, as desired, with the result that the individual blocks produced when the larger, trimmed block is divided, lack the desired uniformity of size and weight.

Accordingly, it is the principal object of this invention to provide a method of cutting cheese which is especially suited for removing a surface layer of non-uniform thickness from an irregular block of cheese in such a way as to produce a substantially plane surface. It is a further object of the invention to provide apparatus especially adapted for carrying out the method of the invention, and further to provide a method and apparatus which will obviate the shortcomings of the methods and equipment heretofore known.

Other objects and advantages of the invention will become apparent and the invention will be understood by reference to the following specification and to the accompanying drawings in which there is illustrated a preferred form of apparatus for carrying out the method of the present invention.

In the drawings:

Figure 1 is a fragmentary perspective view of the preferred apparatus showing the adjustable cutting elements and the movable carriage which propels the block of cheese to be cut into the cutting elements;

Figure 2 is an enlarged fragmentry elevational view, partly sectional, illustrating the mechanism for adjusting the position of the cutting elements relative to one another and to the movable carriage;

Figure 3 is an enlarged fragmentary, sectional elevational view showing the cooperation of the compression roller and cutting blade which constitute a part of the apparatus illustrated in Figure 1;

Figure 4 is an enlarged fragmentary sectional plan view taken along the line 4—4 of Figure 1 and illustrating the means for supporting the roller and cutting blade;

Figure 5 is a fragmentary end elevational view of the compression roller and blade supports illustrated in plan in Figure 4;

Figure 6 is a fragmentary end elevation similar to Figure 5, showing the displacement of the compression roller from the cutting blade during a cutting operation;

Figure 7 is an enlarged plan view, partly sectional, taken along the line 7—7 of Figure 1 and illustrating the anchor and support for one end of the splitting wire which constitutes one of the cutting elements of the apparatus;

Figure 8 is a fragmentary end elevational view, partly sectional, of the splitting-wire support illustrated in Figure 7;

Figure 9 is a sectional view of one of the splitting-wire anchors; and

Figure 10 is a perspective view of the taper plug which forms part of the anchor illustrated in Figure 9.

Briefly, in trimming a block of cheese by the method of the present invention, a knife blade is passed through the block beneath the surface layer that is to be removed, and pressure is simultaneously applied to the block in a direction generally perpendicular to the surface beneath which the knife passes so as to compress the cheese in the local area at and immediately preceding the advancing cutting edge of the blade. It has been found that the surfaces produced by trimming cheese in this manner are quite smooth and exhibit none of the irregularities caused by variations in the depth of the cut when an unassisted cutting blade or wire is used.

One form of apparatus found particularly suitable for carrying out the method of the present invention is illustrated in Figure 1. It comprises a normally stationary sub-frame 15 provided on its upper side with a pair of longitudinally extending channel-shaped rails 17 on which there is supported a movable carriage 19. Straddling the rails 17 is a cutting head 21 which includes an upper, horizontally disposed trimming blade 23 and an intermediate, horizontally disposed splitting wire 25, and an adjusting mechanism 27 for altering the height of the blade and wire above the carriage 19. In the event that it is not desired to split the cheese, the splitting wire may be omitted. Supported on the sub-frame 15 beneath the rails 17 is as uitable hydraulic or other type driving means 29 which is operable to move the carriage 19 along the rails 17 relative to the cutting head 21. Mounted on the upper surface of the carriage 19 is a backing plate or pusher 31 against which a block of cheese to be trimmed is firmly seated and which pushes the block of cheese into the trimming blade and splitting wire. When the driving means 29 is energized, the carriage 19 and the block of cheese supported thereon are advanced into the cutting head 21 whereupon the upper surface of the block is trimmed and the block is simultaneously split longitudinally along its median horizontal plane.

Referring to the component parts of the apparatus in greater detail, the sub-frame 15 is desirably of welded angle iron construction and is provided on its upper side with suitably spaced plate or flange members 33 which provide surfaces for supporting the carriage rails 17 and the cutting head 21. The channel-shaped carriage rails are rigidly secured to the plate members 33 with their open sides facing one another so as to provide tracks for guiding the movement of the carriage 19, as will later be described.

The carriage 19 comprises a horizontally disposed rigid plate member or platform 35 supported upon an underframe 37 having on each side a pair of spaced rollers 39 which ride upon the lower flanges 41 of the opposed rails 17. The rollers 39 are slightly smaller in diameter than the spaces between the upper and lower flanges so that the rollers will roll freely and yet any substantial upward displacement of the carriage will be prevented by engagement of the rollers with the upper flange 43. Securely attached to the carriage underframe 37 is a bracket 45 to which the driving means 29 is rigidly secured.

The carriage is provided along one of its sides with an upwardly extending guide plate 47 which cooperates with the backing plate or pusher 31 to provide mutually perpendicular vertical surfaces for locating a block of cheese upon the movable carriage. The guide plate 47 may be of simple construction, such, for example, as a suitably shaped metal plate attached by means of screws 49 to outriggers (not shown) secured to the carriage. The backing plate or pusher 31 may be of similar construction and comprises a box-like lower stationary portion 51 having a central reinforcing brace 53, and a vertically adjustable upper portion 55 mounted by means of vertically spaced, parallel links 57 and 58 upon a pair of upright standards 59. The upper links 57 are provided with rearward extensions 61 suitably connected to the standards 59 by means of tension springs 63 which urge the upper movable portion 55 of the backing plate upwardly. Each of the standards 59 is provided with an adjusting screw 65, the end of which abuts the underside of the associated rearward link extension 61 to limit the upward travel of the movable back plate portion 55. The lower stationary portion 51 of the backing plate is preferably formed integral with the standards 59 and the entire backing plate 31 is rigidly secured to the carriage surface by suitable means, such as the cap screws 67.

The cutting head 21 comprises a pair of vertical members 69 having base flanges 71 by which the cutting head is securely attached to one of the plate members 33, and an upper, horizontal cross member 73 is joined to the upper ends of the vertical members 69 to form an inverted, U-shaped frame which straddles the carriage rails 17. Each vertical member 69 is provided along its inner side with a dove-tail slot 75 for guiding the movement of vertically spaced mounting blocks 77 and 79, each of which is provided on its outer side with a suitable dove-tail projection 81 engaging the slot, as best shown in Figs. 4 and 7. The knife blade 23 extends between and is supported upon the upper blocks 77 and is rigidly secured thereto by means of screws 83. The upper surfaces 85 of the upper mounting blocks 77 are appropriately inclined (Fig. 5) so that the knife blade 23 will be presented to the block of cheese at the proper angle. The knife blade 23 is desirably provided with a fine, saw-tooth cutting edge 87, as illustrated in Figure 4. However, a knife blade which has a straight cutting edge may be employed with some types of cheese.

It is desirable to present the knife blade 23 to the cheese at such an angle that the lower surface of the blade is substantially horizontal in order to prevent undue drag on the cheese and also to prevent the blade from being deflected upwardly or from digging too deeply into the block, Figures 3, 5, and 6. In order to apply pressure to the cheese ahead of the knife blade 23, there is provided a roller 91. This roller is horizontally disposed and is supported in bearing blocks 93 above the knife blade 23 with its axis disposed forwardly of the cutting edge 87. The bearing blocks 93 are vertically movable in guides 95 secured to the upper mounting blocks 77. A compression spring 97 disposed between the guides 95 urges the bearing blocks 93, and hence the roller 91 downwardly so that when the apparatus is not in use, as illustrated in Figure 5, the roller rests upon the knife blade. However, when the apparatus is in operation and a block of cheese is being cut, the advancing, upper edge of the cheese lifts the roller 91, compressing the springs 97 which in turn urge the roller downwardly against the upper surface of the block to compress the cheese in the area immediately below the roller 91 and adjacent the cutting edge 87 of the blade, as illustrated in Figure 6. As the cheese block is propelled through the cutting head, the roller 91 rides on the upper surface of the block, accommodating itself to the variations in that surface and exerting a downward compressive force proportional to its upward displacement from the blade 23. The bearing blocks 93 are separately movable in their respective guides 95 so that the ends of the roller may rise and fall unevenly as when the oncoming surface of the block slopes to one side or the other, a greater force being applied to the cheese in the area where the surface layer being removed is thicker.

The horizontally disposed splitting wire 25 extends between the lower mounting blocks 79, its ends being secured in the blocks by means of wire anchors 99, as illustrated in Figures 7, 9, and 10. Each anchor comprises a machine screw 101 provided with a central, longitudinally extending hole 103 which flares outwardly at the head end of the screw to form a seat 105 for a tapered plug 107. The splitting wire 25 passes around the taper plug 107 and is seated in a groove 109 at the large end of the plug. It will be appreciated from Figure 9 that the wire is securely anchored by jamming the plug 107 in the flared central opening in the screw and that increasing tension of the wire tends to anchor it all the more firmly. The tension of the wire may be increased by simply turning the screw 101 outwardly and any desired tension may be maintained by means of a lock nut 111. To prevent the lower mounting blocks 79 from becoming jammed in the dove-tail slots 75 under the effect of the wire tensioning forces which are disposed well forwardly of the slots, and the lower mounting blocks are provided at their forward ends with tongues 113 which engage a vertical groove 115 in an auxiliary supporting bracket 117 firmly secured to the vertical members 69 of the cutting head (Figs. 7 and 8).

The vertical adjustment of the trimming blade 23 and splitting wire 25 relative to one another and in the supporting surface of the carriage 19 is effected by a pair of vertical adjusting screws 119 (Figs. 1 and 2) having upper threaded portions 121 engaging threaded holes 123 in the upper mounting blocks 77, and lower threaded portions 125 engaging threaded holes 126 in the lower blocks 79. To maintain the horizontal disposition of the blade and wire, the rotation of the screws 119 is synchronized by an endless chain 127 trained around sprockets 129 keyed or otherwise secured to the adjusting screws 119. A hand wheel 131 secured to one of the screws is therefore effective to raise or lower the trimming blade 23 and splitting wire 25 in unison.

To enable the apparatus to be employed for trimming and splitting blocks which vary in size, the adjusting means is so arranged that the splitting wire 25 always bisects the distance between the cutting blade 23 and the upper surface of the carriage. This is accomplished by providing the threads 125 which engage the lower pair of blocks 79 with half the lead of the threads 123 which engage the upper blocks 77. With this arrangement, any given displacement of the splitting wire will be accompanied by a displacement of the trimming blade of twice the magnitude in the same direction. A pointer 133 secured to one of the lower mounting blocks 79 travels along a scale 135 secured to the adjacent vertical member 69 of the cutting head to render an indication of the distance between the splitting wire and the carriage surface, or any other indication which may be deemed suitable.

In view of the substantial force required to propel the cheese through the cutting head, it is desirable to support the rear surface of the block as closely beneath the plane of the advancing cutting edge 87 as possible in order to prevent the cheese from breaking and forming a ragged edge at the end of the block. In the preferred embodiment of the invention, this is accomplished by making the upper portion 55 of the backing plate or pusher 31 vertically adjustable, as previously described. The proper position of the upper portion of the backing plate relative to the trimming blade 83 is automatically effected by the engagement of rollers 137 carried on the sides of the movable backing plate portion 55 with cams 139 carried by the upper mounting blocks 77, as shown in Figure 1. The cam 139 is so positioned relative to the knife blade 23, and the rollers 137 are so positioned relative to the upper edge of the movable backing plate portion 55, that the upper edge of the movable backing plate portion passes beneath the knife blade. In this way, the proper coordination of the upper edge of the movable backing plate portion and the knife blade is automatically effected irrespective of the vertical position of the knife blade.

In the preferred embodiment, the driving means 29 is of the hydraulic type although any suitable alternative driving means, such as a rack-and-pinion, may be employed. The illustrated driving means comprises a double-acting hydraulic cylinder 141 horizontally mounted on the sub-frame 15 and containing a piston (not shown) connected by means of a connecting rod 143 to the bracket 45 secured to the movable carriage 19. A hand-operated control valve 145 (Figure 1), accessible to the operator standing at the side of the machine, controls the admission of fluid under pressure to either one side or the other of the driving piston in order to move the carriage 19 in either direction along the track.

The type of cheese block for which the illustrated apparatus was especially designed is one which, when taken from the forming hoop, has a fairly smooth bottom surface and side surfaces, but which has an upper surface of unpredictable configuration and alignment. Therefore, the only surface which needs to be trimmed is the upper surface, and it is possible, to split the block and trim its upper surface in a single operation. It will be apparent, however, that the method of the invention is not limited to including a simultaneous splitting operation, or to employment in trimming cheese blocks having only one surface to be trimmed.

The operation of the apparatus is believed to be self-evident from the foregoing description, but may be described briefly as follows: A block of cheese of known size is placed upon the carriage and firmly seated against the guide plate 47 and backing plate 31. The operator then adjusts the trimming blade 23 to the proper height, which in the case of the illustrated apparatus, also positions the splitting wire 25 so as to pass through the block midway between its lower surface and the new upper surface formed by the trimming operation. The operator then energizes the driving means 29 which advances the carriage into the cutting head 21 thereby simultaneously trimming and splitting the block of cheese.

It will be apparent from the foregoing description that the trimming method of the present invention contemplates moving a knife blade through a block of cheese beneath its surface and at sufficient depth that a new, unbroken, substantially plane surface is produced. The method further contemplates that local pressure be applied to the cheese at right angles to the direction of the cut and in the area immediately adjacent and preceding the advancing cutting edge of the knife blade. In the preferred apparatus for carrying out this method, the trimming knife is held stationary in a horizontal plane and the block of cheese is supported on a movable carriage which advances the block into the knife. Pressure is applied to the upper surface of the cheese in the above described manner by a vertically movable roller which, though displaceable upwardly as the thickness of the layer or slice being removed varies, is urged downwardly by a pair of compression springs which engage the movable bearings in which the roller is journalled.

With this improved method and apparatus, it has been found that, irrespective of the configuration of the surfaces of the block and of the variations in thickness of the surface layer to be removed, either along or perpendicular to the direction of the trimming cut, a substantially smooth and plane surface can be produced, thus obviating the shortcomings of previously known trimming methods and devices.

Various of the features of the invention which are believed to be new are set forth in the appended claim.

I claim:

Apparatus for removing the surface layer from a block of cheese comprising a horizontal platform for supporting said block, a knife blade supported above said platform, said knife blade having a flat, horizontally extending, bottom face and a top face which inclines upwardly from the cutting edge of said blade, a roller journalled on an axis disposed parallel to, above and forwardly of the cutting edge of said blade, movable journalling means for said roller disposed so as to permit said roller to rest on said blade, resilient means urging said roller toward said blade, and means for vertically adjusting said blade.

References Cited in the file of this patent

UNITED STATES PATENTS

| Number | Name | Date |
|---|---|---|
| 181,486 | Settle | Aug. 22, 1876 |
| 807,130 | Roussell | Dec. 12, 1905 |
| 811,469 | Woolley | Jan. 30, 1906 |
| 850,464 | Brahm | Apr. 16, 1907 |
| 855,404 | Jensen | May 28, 1907 |
| 866,354 | Gill | Sept. 17, 1907 |
| 1,151,674 | Durrant | Aug. 31, 1915 |
| 1,284,013 | Winkley | Nov. 5, 1918 |
| 1,703,217 | Watson | Feb. 26, 1929 |
| 1,790,592 | Morrison | Jan. 27, 1931 |
| 1,847,536 | Pruefer | Mar. 1, 1932 |
| 1,855,906 | Colling et al. | Apr. 26, 1932 |
| 2,155,730 | Miller | Apr. 25, 1939 |
| 2,232,420 | Witt et al. | Feb. 18, 1941 |
| 2,350,586 | Carroll | June 6, 1944 |
| 2,475,824 | Devine | July 12, 1949 |
| 2,498,615 | Copenhaver | Feb. 21, 1950 |